H. W. KARDELL.
TRACTION WHEEL.
APPLICATION FILED JUNE 8, 1918. RENEWED JUNE 6, 1921.
1,385,455.
Patented July 26, 1921.
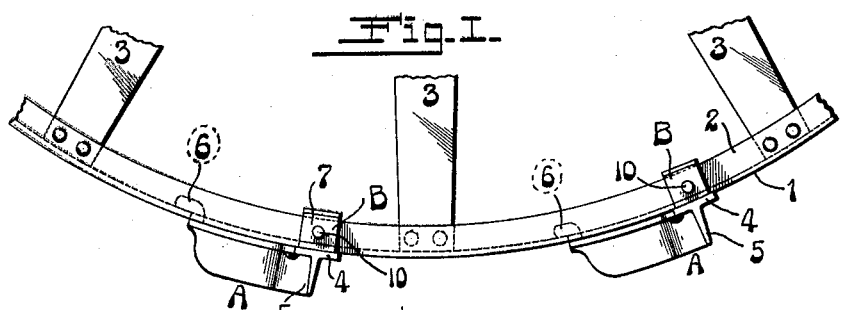
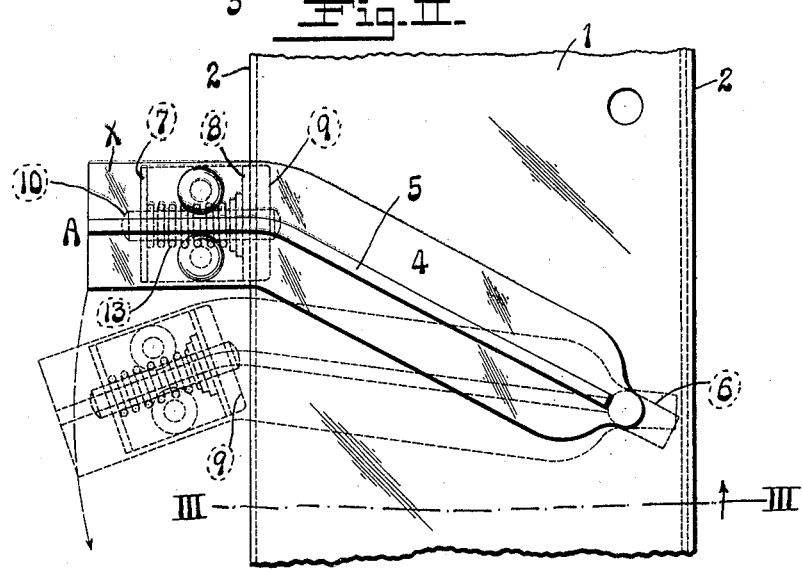
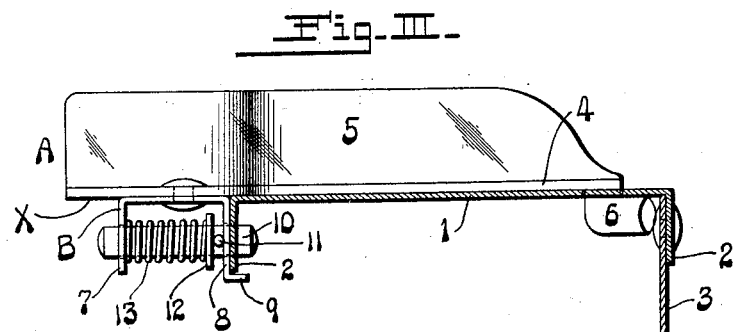
WITNESS.
Charles A. Becker
INVENTOR.
H. W. Kardell,
BY
Knight & Cook
HIS ATTORNEYS.

UNITED STATES PATENT OFFICE.

HENRY W. KARDELL, OF UNIVERSITY CITY, MISSOURI, ASSIGNOR TO KARDELL TRACTOR & TRUCK COMPANY, OF ST. LOUIS, MISSOURI, A CORPORATION OF DELAWARE.

TRACTION-WHEEL.

1,385,455.      Specification of Letters Patent.      Patented July 26, 1921.

Application filed June 8, 1918, Serial No. 239,037. Renewed June 6, 1921. Serial No. 475,556.

*To all whom it may concern:*

Be it known that I, HENRY W. KARDELL, a citizen of the United States of America, a resident of University City, in the county of St. Louis, State of Missouri, have invented certain new and useful Improvements in Traction-Wheels, of which the following is a full, clear, and exact description, reference being had to the accompanying drawing, forming a part of this specification.

My invention relates to improvements in traction wheels, and more particularly to a wheel provided with traction spurs or lugs. The main features of novelty lie in "quick-detachable" fastening means whereby the traction spurs or lugs are secured to the wheel. The main object of the invention is to produce a strong and simple detachable fastening means securely holding the traction spurs on the wheel, and allowing the spurs to be very easily and quickly attached to and detached from the wheel.

In the preferred form of the invention, the traction spurs are in the form of cleats arranged transversely of the wheel rim, one end of each spur being pivotally interlocked with the rim, and the opposite end being provided with a quick-detachable fastening device, preferably a spring actuated latch, whereby the traction spur is prevented from turning on the pivot. In applying one of the traction spurs to a wheel, it is only necessary to insert one end of the spur through a hole in the rim, thereby providing a pivotal connection, and thereafter, by merely moving the spur on the axis of the pivot, it can be securely attached to the wheel.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a fragmentary view illustrating a portion of a traction wheel embodying the features of my invention.

Fig. II is an enlarged detail view showing a portion of the rim of the wheel and one of the traction spurs, or lugs, mounted thereon.

Fig. III is a section on the line III—III, Fig. II.

The wheel rim herein shown is a channel-shaped member provided with a tread web 1 and side flanges 2 extending inwardly from said web. Spokes 3 are secured to the inturned side flanges 2.

A designates traction spurs preferably T-shaped in cross section (Fig. I), each of said spurs having a web 4 engaging the outer face of the wheel rim and a leg 5 extending outwardly from said web. Each traction spur is preferably in the form of a cleat, bent as shown in Fig. II to provide an inclined portion arranged transversely of the wheel rim and at an angle to the axis of the wheel, and an end portion X extending from one side of the rim. The extended end portion is preferably parallel with the axis of the wheel.

The tread portion of the rim is preferably perforated to receive projections 6 extending from end portions of the traction spurs so as to interlock said end portions with the wheel rim. Each of the extensions or projections 6 is approximately L-shaped, so that it can be readily inserted through a perforation in the wheel rim and then positioned as shown in Fig. III to engage the inner face of the rim. The extensions 6, preferably formed integral with the traction spurs, pivotally connect said spurs to the wheel, but I preferably utilize other fastening means for preventing the spurs from turning on the pivots.

The extended end portion of each traction spur is provided with a latch holder B comprising legs 7 and 8, the leg 8 having a foot 9 which normally laps one of the rim flanges 2. The last mentioned rim flange is perforated to receive latch bolts 10, slidably mounted in the latch holders B. Each latch device may also include a pin 11

(Fig. III) arranged transversely of the latch bolt, a spring seat 12 engaging said pin, and a spring 13 interposed between the seat 12 and the leg 7 of the latch holder. The spring 13 normally retains latch bolt 10 in the locked position shown in Fig. III, wherein the latch bolt extends through a portion of the wheel rim.

By referring to Fig. III, it will be seen that the elements 8 and 9 of the latch holder are combined with a portion of the traction spur to provide a hook adapted to interlock with the wheel rim. The member 9, forming part of this "hook", normally prevents the traction spur from moving outwardly relative to the outer face of the wheel rim. The member 8 provides an abutment which engages a side of the rim to limit the pivotal movement of the traction spur. This abutment member 8 receives the thrusts tending to turn the traction spur on its pivot.

To remove one of the traction spurs from the wheel, the first step consists in unlocking the latch bolt 10 by withdrawing it from the perforation in the wheel rim, thereby allowing the traction spur to swing on the axis of its pivotal extension 6. The traction spur can then be easily moved to the position shown by dotted lines in Fig. II, wherein the foot 9 lies entirely beyond the side face of the wheel rim, and the free end portion of the spur can then be easily manipulated to withdraw the pivotal extension 6 from the wheel rim. To secure one of the traction spurs to the wheel, the pivotal extension 6 is inserted through one of the perforations in the wheel rim and the traction spur is then moved to the position shown by full lines in Figs. II and III, thereby interlocking both end portions of the spur with the wheel rim, and at the same time automatically latching the bolt 10 to securely hold the traction spur in interlocking engagement with the rim.

I claim:—

1. A traction wheel having a rim, traction spurs in the form of cleats arranged transversely of the rim, and latches whereby said traction spurs are detachably secured to the rim, each of said latches including a movable latch member and a spring tending to retain said latch member in its operative position.

2. A traction wheel having a rim, traction spurs in the form of cleats arranged transversely of the rim, one end of each traction spur being provided with a pivotal extension interlocked with the rim and the opposite end portion being provided with a hook adapted to interlock with the rim, each traction spur being free to move about the axis of its pivotal extension so as to permit its hook to be interlocked with and removed from the rim, and detachable fastening devices whereby said spurs are secured to the rim.

3. A traction wheel having a rim comprising a tread web provided with inturned side flanges, traction spurs in the form of cleats arranged transversely of the rim, one end of each traction spur being provided with a pivotal extension projecting through and interlocked with said tread web and the opposite end portion being provided with a hook adapted to interlock with one of said side flanges, each traction spur being free to move about the axis of its pivotal projection so as to permit its hook to be interlocked with and removed from the rim, and detachable fastening devices located adjacent to the hooks so as to detachably secure said spurs in interlocking engagement with said rim.

4. A traction wheel having a rim comprising a tread web provided with inturned side flanges, traction spurs in the form of cleats arranged transversely of the rim, one end of each traction spur being provided with a pivotal extension projecting through and interlocked with said tread web and the opposite end portion being provided with a hook adapted to interlock with one of said side flanges, each traction spur being free to move about the axis of its pivotal projection so as to permit its hook to be interlocked with and removed from the rim, and detachable fastening devices located adjacent to the hooks so as to detachably secure said spurs in interlocking engagement with said rim, each of said fastening devices comprising a spring actuated latch bolt arranged transversely of the rim and extending through one of said side flanges.

5. A traction wheel having a tread rim, traction spurs in the form of cleats arranged diagonally of said tread rim, one end of each of said cleats being provided with a pivotal extension projecting into and interlocked with said rim and the opposite end portion being provided with a hook adapted to interlock with one side of the rim, said hook having an abutment face engaging the side of the rim to limit pivotal movement of the cleat, each cleat being movable about the axis of its pivotal extension to permit its hook to be interlocked with and removed from the rim, and spring actuated latch devices whereby said hooks are retained in interlocking engagement with said rim.

6. A traction wheel having a tread rim, traction spurs in the form of cleats arranged diagonally of said tread rim, one end of each of said cleats being provided with a pivotal extension projecting into and interlocked with said rim and the opposite end portion being provided with a hook adapted to interlock with one side of the rim, said hook having an abutment face engaging the side of the rim to limit pivotal movement of the cleat, each cleat being movable about the axis of its pivotal extension to permit its hook to be interlocked with and removed from the rim, and spring actuated latch devices whereby said hooks are retained in interlocking engagement with said rim, each of said spring actuated latch devices including a latch member located adjacent to the hook with which it is associated and a spring whereby said latch member is yieldingly retained in its locking position.

In testimony that I claim the foregoing I hereunto affix my signature.

HENRY W. KARDELL.